April 23, 1968  W. BAUMEISTER  3,378,967
MARKER FOR UNDERGROUND MARKING OF MEASURING POINTS
Filed Jan. 6, 1965  3 Sheets-Sheet 1
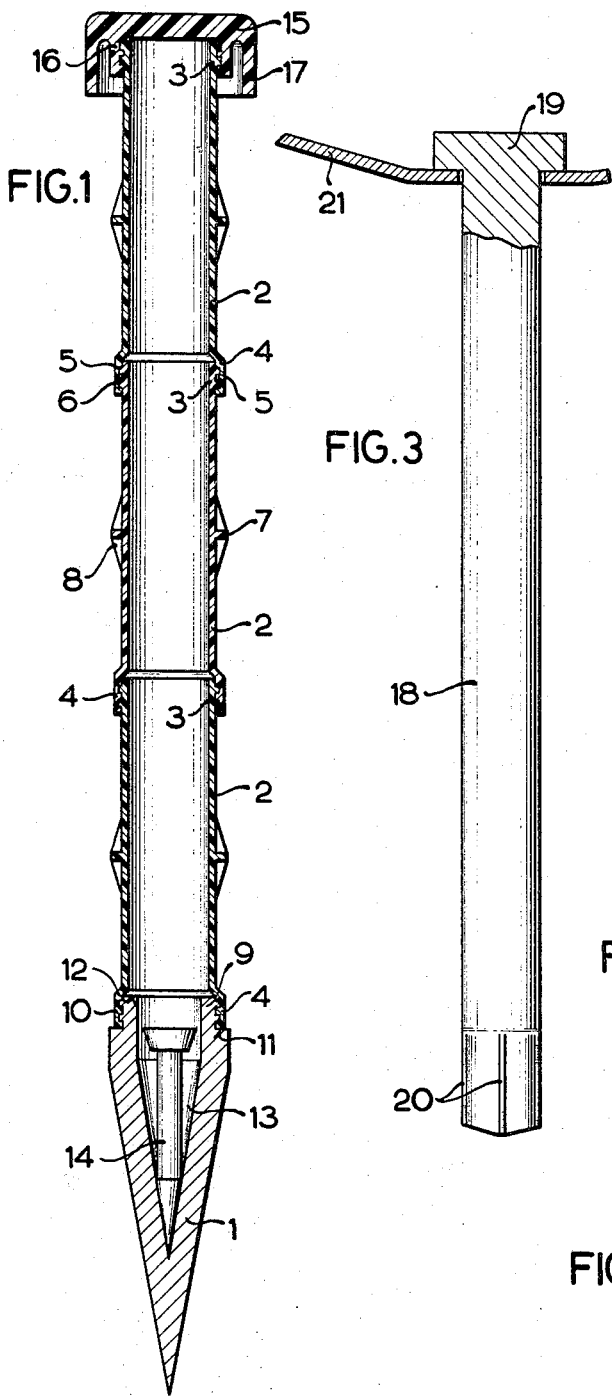
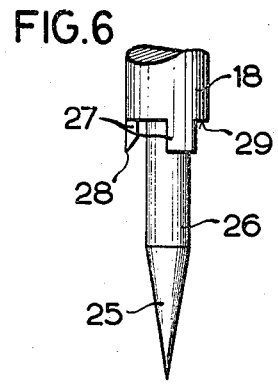
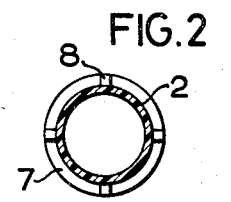
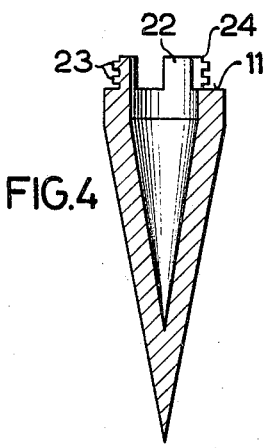
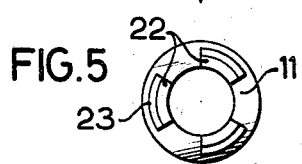
INVENTOR
Wolfgang BAUMEISTER
By
Lowry & Rinehart
his ATTORNEYS April 23, 1968 — W. BAUMEISTER — 3,378,967
MARKER FOR UNDERGROUND MARKING OF MEASURING POINTS
Filed Jan. 6, 1965 — 3 Sheets-Sheet 2

INVENTOR
Wolfgang BAUMEISTER
By
Lowry & Rinehart
his ATTORNEYS

April 23, 1968  W. BAUMEISTER  3,378,967
MARKER FOR UNDERGROUND MARKING OF MEASURING POINTS
Filed Jan. 6, 1965  3 Sheets-Sheet 3

INVENTOR
Wolfgang BAUMEISTER
By
*Lowry & Rinehart* his ATTORNEYS

United States Patent Office 3,378,967
Patented Apr. 23, 1968

3,378,967
MARKER FOR UNDERGROUND MARKING
OF MEASURING POINTS
Wolfgang Baumeister, 11 Im Ort, Ludenscheid,
Westphalia, Germany
Filed Jan. 6, 1965, Ser. No. 423,796
Claims priority, application Germany, Jan. 21, 1964,
B 75,076; Aug. 7, 1964, B 58,575; Sept. 24, 1964,
B 78,655
13 Claims. (Cl. 52—98)

This invention relates to markers for underground marking of measuring points of the type comprising a conical pointed member of resistant solid material and a tube of lighter specific weight.

Markers of this type can be generally used for marking any desired measuring points and especially for marking boundary points in surveying.

Tubular markers for measuring points are already known, which are driven or screwed into the ground. These markers are especially open to the objection that the conical pointed member is firmly mounted on the tube so that the conical pointed member can be displaced by unauthorized handling of the tube. There is also the danger that during agricultural work a tube may be gripped by heavy vehicles or plough-shares or in construction work by heavy cross-country vehicles and especially bulldozers and is torn out of the ground whereby the conical pointed member marking the measuring point proper is also displaced.

It is the object of the present invention to provide a marker for measuring points, in which the conical pointed member marking the measuring point proper is introduced into the ground in such a manner that it cannot be removed.

It is a further object of the present invention to provide a particularly simple and efficient marker for underground marking of measuring points.

These objects are achieved according to the invention by providing a marker which comprises a conical pointed member consisting of resistant solid material and a tube of lighter specific weight seated on the conical pointed member so that a bar can be inserted into the tube for driving the marker into the ground, said bar bearing directly against the conical pointed member.

Thus, the tube with the conical pointed member can be struck or driven into the ground. After the marker has been introduced the conical pointed member is detached from the tube by an additional knock with the striking bar so that the measuring point is permanently marked by the conical pointed member. When the tube is pulled out or displaced accidentally or by unauthorized persons the conical pointed member marking the measuring point will remain in its position. Even when the tube gets lost the conical pointed member can be found again at any time by known searching methods.

According to a particularly expedient embodiment of the invention the tube may comprise a plurality of tube sections each having a sleeve-like extension at one end and a socket-like extension at the other end, each sleeve-like extension having circumferential grooves on its outside and each socket-like extension having on its inside circumferential grooves fitting the circumferential grooves on the sleeve-like extension, said tube sections being fitted into one another to form the tube and being axially secured during such fitting operation. Such a tube can be easily introduced into the ground since the tube sections are firmly connected in axial direction. When, for example, the uppermost tube section is gripped by a plough-share or bulldozer it will break off laterally from the respective underlying tube section so that all that is torn out is the uppermost tube section.

The striking bar preferably has an annular end shoulder which bears against an annular shoulder of the conical pointed member. Fitted over the upper portion of the striking bar is a socket of insulating material on which an insert ring is further seated which engages in the end face of the socket-like extension of the uppermost tube section section so that the entire tube together with its pointed end is securely guided when being driven in. While the marker is being driven into the ground the striking bar is held and guided manually or by means of a suitable tool on the insulating socket. The insulating socket prevents the holding tool from being energized should the conical pointed member, for example, cut into an electric cable.

A suitable closure cap may be fitted on the respective uppermost tube section and serve as a visual identifying mark and for centrally receiving a ranging rod. Further, a cutting screw may be fitted on the outside of the conical pointed member so that the marker can also be screwed into the ground as may be of advantage with certain types of soil. In this case the conical pointed member is provided in its interior with a polygonal hole for insertion of a polygonal pointed end of the driving bar. The head of the driving bar is provided with a polygonal guide for engagement of a tool for screwing the marker into the ground.

The conical pointed member preferably consists of a hard resistant metal such as aluminium or corrosion-resistant steel. The tube sections consist of a suitable corrosion-resistant plastic. It is especially the advantageous elastic properties of plastic that permit a tube section to be torn off laterally as has already been set forth above.

Several preferred embodiments of the invention will now be described by way of example and with reference to the accompanying drawings, in which:

FIG. 1 is a longitudinal section through a marker for underground marking of measuring points according to the invention;

FIG. 2 is a cross section therethrough;

FIG. 3 is an elevational view, partly in section, of a striking bar for inserting a marker according to the invention;

FIG. 4 is a longitudinal section through an alternative embodiment of a conical pointed member, a first embodiment of the conical pointed member being shown in FIG. 1;

FIG. 5 is a top plan view of FIG. 4;

FIG. 6 is a part elevational view of another embodiment of the striking bar;

Figure 7:
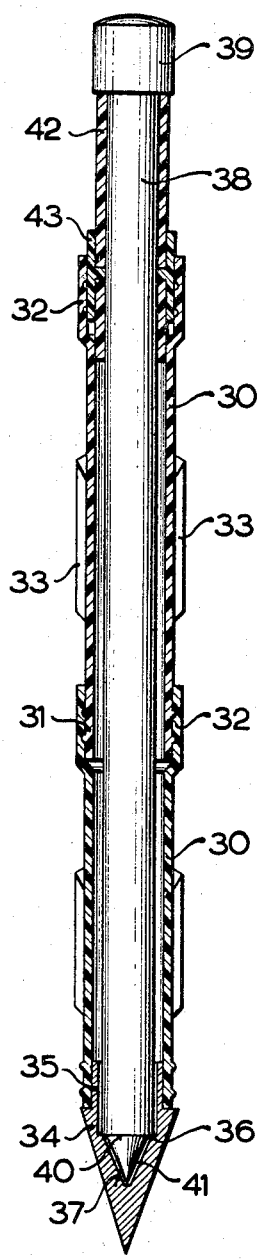
FIG. 7 is a longitudinal section through another embodiment of the marker according to the invention.

FIG. 1 shows a marker for underground marking of measuring points according to the invention and comprising a conical pointed member 1 on which a tube preferably consisting of tube sections 2 is seated. The conical pointed member 1 preferably is made of aluminium or another solid material which permits the marker to be struck or driven into the ground and is sufficiently resistant to corrosion. The tube sections 2 are inserted into one another by means of sleeve-like extensions 3 and socket-like extensions 4 fitting one another. Circumferential projections and grooves 5 and 6 fitting one another are arranged on the inner surfaces of the socket-like extensions 4 and the outer surfaces of the sleeve-like extensions 3. Further, the central portion of each tube section 2 is reinforced on its outside by a stiffening ring 7 provided with ribs 8.

The conical pointed member 1 has on its end face a sleeve 9 the outside diameter of which is equal to the inside diameter of the socket-like extensions 4 of the tube sections 2 and the outer surface of which is likewise provided with circumferential projections 10. The tube section 2 which is fitted on the conical pointed member 1 is seated on an annular shoulder 11 of the latter. The sleeve 9 terminates in an annular end face 12 having an inside diameter smaller than the inside diameter of the tube. Further, the conical pointed member 1 has in its interior a conical recess 13 into which a known boundary marking cone 14 can be inserted.

A further embodiment of the conical pointed member 1 is illustrated in FIGS. 4 and 5. A plurality of end studs 22 are seated on the annular shoulder 11, three such end studs arranged symmetrically being shown, for example, in FIG. 5. The outer surfaces of the end studs 22 have a plurality of outwardly projecting portions 23 fitting the circumferential grooves 6 of the tube sections 2. The end studs 22 have bevelled outer edges 24.

In the embodiment shown in FIG. 1, the marker according to the invention is upwardly closed by a closure cap 15 fitted by means of a socket 16 on the sleeve-like extension 3 of the uppermost tube section 2. The edge of the closure cap 15 is pulled down to form an annular peripheral flange 17 so that the head of the marker proposed by the invention is covered on all sides.

FIG. 3 shows a striking bar 18 for driving in the marker proposed by the invention and having an outside diameter of the same dimension as the inside diameter of the tube sections 2. The striking bar 18 terminates at the upper end in a striking head 19 and is provided at its lower end with drill-like ribs 20 so that the striking bar 18 can also be used as percussion drill for drilling a hole first. A stripper plate 21 is slipped over the striking bar 18 to permit the latter to be easily pulled out of the ground or out of the tube sections 2.

The striking bar 18 may also be of the construction shown in FIG. 6 where it terminates at its lower end in a pointed end 25 adapted to the form of the conical recess 13 in the conical pointed member 1. A cylindrical portion 26 of the striking bar 18 is inwardly offset relative to the upper portion of the striking bar so that an annular space is left free between the cylindrical portion 26 and the inner surface of the conical pointed member 1 when the striking bar 18 is inserted in the latter. The striking bar 18 in FIG. 6 further has a lower end face 29 provided in its marginal region with several, preferably three, studs 27 having ends 28 terminating in a sharp edge.

The marker for marking measuring points as proposed by the invention is used in the following manner: First the required number of tube sections 2 is determined according to the actual ground conditions. The tube sections 2 are fitted upon one another and after that they cannot be pulled apart again due to the action of the circumferential projections and grooves 5 and 6. Only when they are subjected to bending stress can the tube sections 2 be separated.

If necessary, a hole can be drilled first by means of the striking bar 18. Then the striking bar 18 is inserted into the tube sections 2 thus prepared and seated on the conical pointed member 1, the striking bar 18 bearing against the annular end face 12 of the sleeve 9. Now the entire marker can be driven into the ground. After the intended depth has been reached the striking bar 18 is pulled out again by means of the stripper plate 21. Now the marker can be plumbed once more by lowering a plumb into the tube. The stiffening rings 7 get caught in the ground so that the marker cannot be pulled out of the ground.

Since the tube sections 2 consist of noncorroding plastic, the marker proposed by the invention can be easily found. The attached closure cap 15 is a great help in finding the marker. All that can be pulled off by bending stress is the uppermost tube section 2, but the conical pointed member 1 which is seated deep in the ground cannot be pulled out or displaced. Especially when a striking bar as shown in FIG. 6 and an associated conical pointed member as shown in FIG. 4 are used the conical pointed member cannot be displaced. When using this striking bar first the studs 27 are inserted between the end studs 22 so that the end face 29 of the striking bar 18 will be seated on the end faces of the end studs 22. After the marker has been driven in, the striking bar 18 is turned until the ends 28 of the studs 27 engage behind the end studs 22. By a few slight knocks on the striking bar the end studs 22 are broken down inwardly so that now the conical pointed member is no longer in connection with the rest of the tube. In this case damage or injury to the tube cannot affect the underground marker in the form of the conical pointed member.

Figure 8:
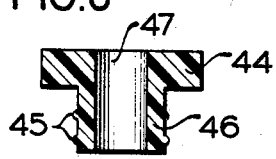
FIG. 8 is a section through a closure cap for the marker.
Figure 11:
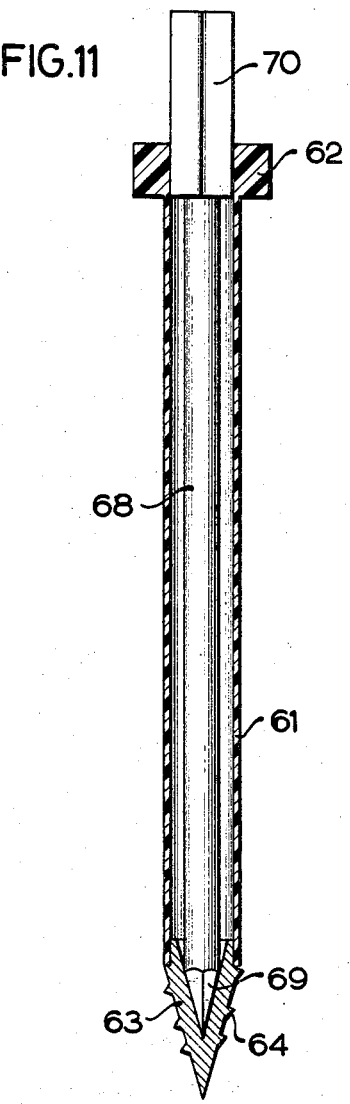
FIG. 11 is a similar section through a further embodiment of the marker according to the invention, the marker in this embodiment being adapted to be screwed into the ground.
Figure 12:
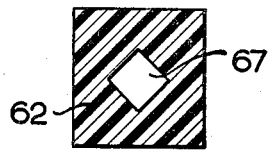
FIG. 12 is a cross section through a closure cap for this embodiment.
Figure 13:
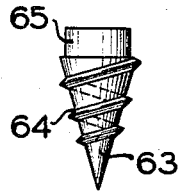
FIG. 13 is an elevational view of a conical pointed member to be used with the embodiment of FIG. 11.
Figure 14:
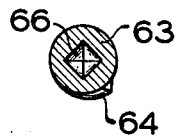
FIG. 14 is a cross section through this conical pointed member.

FIGS. 7 and 8 show a further embodiment of the marker proposed by the invention. In this embodiment likewise tube sections 30 having a sleeve-like extension 31 at one end and an outwardly offset socket-like extension 32 at the other end are provided. Guide ribs 33 are arranged on the outside of the tube sections 30 and there is a conical pointed member 34 having a sleeve-like extension 35 inserted in the lowermost tube section 30. An annular shoulder 36 is provided in the interior of the conical pointed member 34 adjacent a frustoconical recess 37. There is a striking bar 38 having a striking head 39 and at the other end an annular shoulder 40 adjacent a conical pointed end 41. An insulating socket 42 is fitted at the upper end of the striking bar 38 and carries an insert ring 43.

For driving in this marker the striking bar 38 is inserted into the tube sections 30 and the conical pointed member 34 as illustrated in FIG. 7. The insert ring 43 serves for guiding the striking bar 38 in the uppermost tube section 30. The insulating socket 42 serves for holding and guiding the striking bar 38 when being struck in and also for insulating the holding portion of the striking bar when the conical pointed member hits upon an electric cable. The marker shown in FIG. 7 is struck into the ground by means of the striking bar 38 until the upper end of the uppermost tube section 30 is flush with the surface of the ground. Then the striking bar 38 is pulled out. After that a further striking bar having no insulating socket 42 is inserted into the marker and by a few further knocks the conical pointed member 34 is forced out of the lowermost tube section 30 so that the conical pointed member 34 will be seated freely in the ground at the intended depth. Thus, the conical pointed member 34 has been inserted at the measuring point so that it cannot be lost. As has already been mentioned, the uppermost tube section 30 can be torn off laterally when being subjected to bending stress since the connection of the tube sections 30 can be detached by bending loads.

The uppermost tube section 30 is closed by a closure cap 44 shown in FIG. 8 and insertable in the socket 42 of the uppermost tube section with a sleeve 46 having peripheral projections 45. A through opening 47 of the closure cap 44 permits a ranging rod to be centrally inserted therein to allow the marking point to be measured. The opening 47 can be closed by means of a plug not shown.

Figure 9:
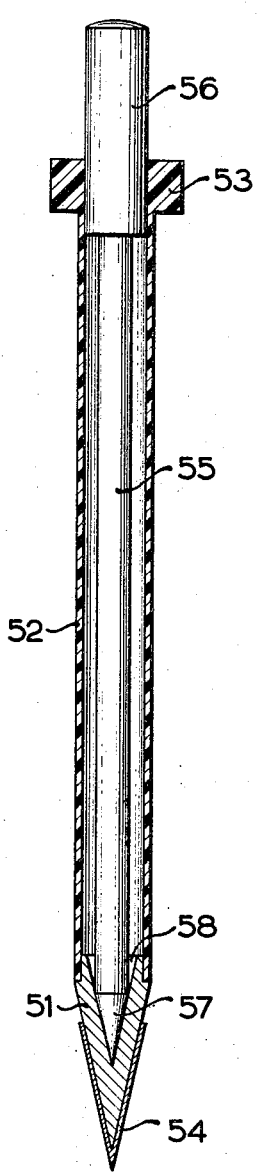
FIG. 9 is a longitudinal section through another embodiment of the marker according to the invention.
Figure 10:
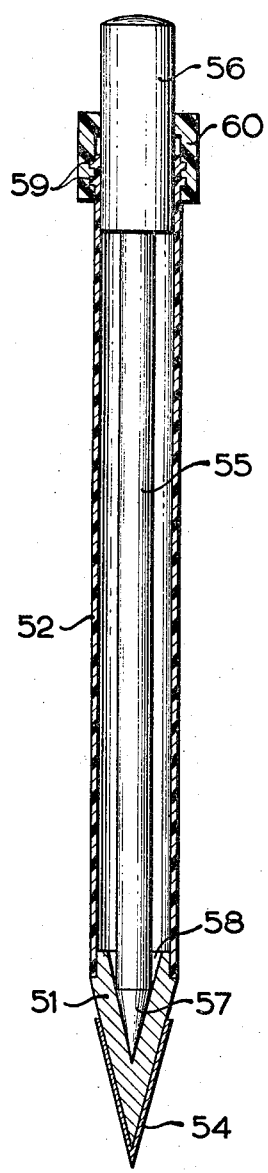
FIG. 10 is a similar section through a further embodiment of the marker according to the invention.

A further embodiment of the marker proposed by the invention is shown in FIG. 9 where an integrally constructed tube 52 provided with an end collar 53 is detachably fitted and seated on a conical pointed member 51 armed with a very hard steel cone 54 so that this arrangement is particularly suitable for stony ground. A striking bar 55 with a striking head 56 and substantially of the same construction as that described with reference to FIG. 7 engages with a pointed end 57 in a conical inner space 58 of the conical pointed member 51. The end collar 53 is provided with a through opening for receiving the striking head 56 and adapted to be closed by means of a plug not shown. A similar arrangement is shown in FIG. 10 where a closure cap 60 is detachably fitted on peripheral projections 59 at the end of the tube 52 and held by said projections. In this embodiment of the invention, as in the previously described embodiments, it is of particular advantage that the forces occurring when striking in the marker are directly transmitted to the conical pointed member without straining the head of the tube sections or damaging it.

In some cases it is desirable to screw the marker into the ground. An embodiment of the invention suitable for this purpose is illustrated in FIGS. 11 to 14 where an integrally constructed tube 61 having a circumferentially projecting end flange 62 is provided. For different types of ground tubes of different lengths may be provided. Instead of the single tube 61 several tube sections may be used as described above. The tube or the tube sections preferably consist of a plastic material having a small weight and a high resistance to wear.

A conical pointed member 63 is inserted into the base end of the tube 61 and provided on its outside with a cutting screw 64. A flange 65 serves for insertion of the conical pointed member 63 in the tube 61. The conical pointed member 63 is further provided in its base with a central pyramidal polygonal, for example, square hole 66.

The circumferentially projecting end flange 62 of the tube 61 is provided with a polygonal, for example square, aperture 67. In this embodiment of the invention a driving bar 68 is used which at its lower end terminates in a polygonal, for example square, pointed end 69 fitting into the polygonal hole 66. A polygonal, for example square, guide 70 fitting into the polygonal aperture 67 is provided at the upper end of the driving bar 68.

For screwing in this marker a tool engaging the polygonal guide 70 is used. Through the square pointed end 69 the rotary force is directly transmitted to the conical pointed member 63. Consequently, the tube 61 or the tube sections are subjected to only very small load, but the tube 61 follows the rotation of the polygonal guide 70. After the marker has been screwed in at the required depth the conical pointed member can be further screwed in so as to become free of the tube, using for such further screwing operation another driving bar having a shorter polygonal guide. Thus, also with this marker the advantages described in detail above are achieved.

In details the parts of the marker proposed by the invention may be of different construction. Especially the number and length of the individual tube sections can be adapted to various requirements. Also different colours may be used for the closure caps to distinguish between markers of different orders.

I claim:

1. A marker for underground marking of measuring points comprising a conical pointed member of relatively rigid material, a tube joined to said conical member, said tube and conical member being joined to each other by an axial boss of said conical member being received internally of an end portion of said tube, and a plurality of axially opening grooves dividing said boss into a plurality of axially directed projections whereby said conical member can be detached from said tube by fracturing said projections by means of an associated tool.

2. The marker as defined in claim 1 wherein said tube is formed from a plurality of tube sections, each tube section has a sleeve-like extension at one axial end thereof and a socket-like extension at an opposite axial end thereof, means fixedly securing each socket-like extension into an associated sleeve-like extension, and each tube section being provided with an exterior peripheral reinforcing means between the axial ends thereof.

3. The marker as defined in claim 1 in combination with a tool for driving the marker into the ground, and said tool having an end portion provided with a plurality of axially opening grooves dividing said end portion into a plurality of axially directed projections and abutment faces between each adjacent pair of projections.

4. The marker as defined in claim 3 wherein said last-mentioned projections include terminal cutting edges.

5. A marker for underground marking of measuring points comprising a conical pointed member of relatively rigid material, a tube joined to said conical member at a first axial end portion of said tube, and tubular electrical insulating means at an axially opposite end portion of said tube whereby the tube may be manually grasped and accidental conductivity of electricity from an underground source to the operator is prevented, said opposite end portion being provided with a socket-like extension, and said tubular insulating means being in internal coaxial relationship with said socket-like extension.

6. A marker for underground marking of measuring points comprising a conical pointed member of relatively rigid material, tube joined to said conical member at a first axial end portion of said tube, and tubular electrical insulating means at an axially opposite end portion of said tube whereby the tube may be manually grasped and accidental conductivity of electricity from an underground source to the operator is prevented, said opposite end portion being provided with a socket-like extension, said socket-like extension including means for guiding a tool internally of said tube, and said tubular insulating means being in internal coaxial relationship with said socket-like extension.

7. A marker for underground marking of measuring points comprising a conical pointed member of relatively rigid material, a tube joint to said conical member at a first axial end portion of said tube, and tubular electrical insulating means at an axially opposite end portion of said tube whereby the tube may be manually grasped and accidental conductivity of electricity from an underground source to the operator is prevented, said opposite end portion being provided with a pair of nested socket-like extensions, an outermost one of said socket-like extension forming an integral part of said tube, an innermost one of said socket-like extensions including means for guiding a tool internally of said tube, and said tubular insulating means being in internal coaxial relationship with said innermost socket-like extension.

8. A marker for underground marking of measuring points comprising a conical pointed member of relatively rigid material, a tube joined to said conical member at a first axial end portion of said tube, and tubular electrical insulating means at an axially opposite end portion of said tube whereby the tube may be manually grasped and accidental conductivity of electricity from an underground source to the operator is prevented, said conical member having an interior frusto-conical recess converging in a direction toward the apex of the conical member, and said recess terminating at an annular shoulder remote from and directed away from said apex.

9. The marker as defined in claim 7 wherein said guiding means is a radially inwardly directed peripheral flange.

10. A marker for underground marking of measuring points comprising a conical pointed member of relatively rigid material, a tube joined to said conical member at a first axial end portion of said tube, and said conical member is provided with an interior polygonal recess adapted to receive a complementary contoured end of a driving tool for rotating the marker to imbed the same in the ground.

11. The marker as defined in claim 10 wherein the conical pointed member is provided with a cutting screw on its exterior.

12. The marker as defined in claim 10 wherein said tube includes an axially opposite end portion, and said opposite end portion includes a central polygonal aperture adapted to receive a complementary contoured portion of the driving tool.

13. The marker as defined in claim 10 wherein said opposite end portion is a separate closure cap removably secured to said tube.

References Cited

UNITED STATES PATENTS

| | | | |
|---|---|---|---|
| 122,656 | 1/1872 | Rogers | 52—726 |
| 191,919 | 6/1877 | Bonner | 52—103 |
| 408,379 | 8/1889 | Cunningham | 52—726 |
| 649,416 | 5/1900 | Terry | 52—157 |
| 1,875,137 | 8/1932 | Pollack | 52—103 |
| 1,943,018 | 1/1934 | Hewch | 52—165 |
| 2,269,646 | 1/1942 | Burke | 52—127 X |
| 2,713,327 | 7/1955 | West | 52—155 X |
| 3,139,163 | 6/1964 | Haller | 52—155 |
| 3,174,588 | 3/1965 | Kessler | 52—103 |
| 3,205,626 | 9/1965 | Attenberger | 52—103 |

FOREIGN PATENTS

| | | |
|---|---|---|
| 138,559 | 9/1950 | Australia. |
| 497,870 | 12/1938 | Great Britain. |
| 333,186 | 12/1935 | Italy. |

HENRY C. SUTHERLAND, *Primary Examiner.*

FRANK L. ABBOTT, *Examiner.*

PRICE C. FAW, R. S. VERMUT, *Assistant Examiners.*